United States Patent [19]
Gil

[11] Patent Number: 5,991,678
[45] Date of Patent: Nov. 23, 1999

[54] METHOD AND APPARATUS FOR CONTROLLING AN AUTOMATIC TRANSMISSION IN THE ABSENCE OF A DRIVING MODE SIGNAL FROM A DRIVING MODE SENSOR

[75] Inventor: Sung-Hong Gil, Seoul, Rep. of Korea

[73] Assignee: Hyundai Motor Company, Ltd., Seoul, Rep. of Korea

[21] Appl. No.: 08/773,550

[22] Filed: Dec. 27, 1996

[30] Foreign Application Priority Data

Dec. 29, 1995 [KR] Rep. of Korea ................. 95-66780

[51] Int. Cl.[6] ............................. G06G 7/70; B60K 44/04
[52] U.S. Cl. ............................. 701/51; 701/55; 701/54; 701/69
[58] Field of Search ............................. 701/51, 69, 55, 701/54

[56] References Cited

U.S. PATENT DOCUMENTS

| | | | |
|---|---|---|---|
| 5,566,070 | 10/1996 | Mack et al. .......................... | 701/51 |
| 5,726,889 | 3/1998 | Shinojima et al. .................. | 701/55 |
| 5,757,153 | 5/1998 | Ito et al. .............................. | 318/370 |
| 5,826,209 | 10/1998 | Matsuno .............................. | 701/69 |
| 5,828,974 | 10/1998 | Hawarden et al. ................. | 701/51 |
| 5,895,435 | 4/1999 | Otha et al. ........................... | 701/59 |

*Primary Examiner*—William A. Cuchlinski, Jr.
*Assistant Examiner*—Olga Hernandez

[57] ABSTRACT

An apparatus for controlling an automatic transmission of a vehicle in the absence of a driving mode signal indicating a driving mode of the vehicle, includes monitoring means for monitoring output from a driving mode sensor; determining means for determining whether a driving mode signal has been received from the driving mode sensor based on the monitoring; sensing means for sensing a direction in which the vehicle is traveling; transmission control means placing the automatic transmission in first gear when the determining means determines that a driving mode signal has not been received, and for controlling the automatic transmission such that the vehicle continues to travel in the detected direction.

16 Claims, 3 Drawing Sheets

| TIME INTERVAL / ROTATION DIRECTION | t1 | t2 | t3 | -------- | tn |
|---|---|---|---|---|---|
| A | MEDIUM | SMALL | LARGE | -------- | MEDIUM |
| B | MEDIUM | LARGE | SMALL | -------- | MEDIUM |

METHOD AND APPARATUS FOR CONTROLLING AN AUTOMATIC TRANSMISSION IN THE ABSENCE OF A DRIVING MODE SIGNAL FROM A DRIVING MODE SENSOR

BACKGROUND OF THE INVENTION

1. Field of the Invention

The present invention generally relates to a method and apparatus for controlling an automatic transmission in the absence of a driving mode signal from a driving mode sensor.

2. Description of the Related Art

Vehicles equipped with an automatic transmission typically have several driving modes. Those driving modes generally include park (P), reverse (R), neutral (N), drive (D), and lower speed ranges. The vehicle is equipped with a driving mode select lever by which a driver can select one of the driving modes P, R, N, D, etc. A driving mode sensor generates a signal indicating which of the driving modes the vehicle operator has selected. For example, a potentiometer can serve as the driving mode sensor, wherein the resistance changes as the driving mode select lever changes position.

As the driving mode select lever is moved from one driving mode to the other, the driving mode sensor outputs a signal indicating each driving mode. For instance, as the driving mode select lever is moved from park to drive, the driving mode sensor indicates the driving modes of park, reverse, neutral, and then drive. The driving mode sensor, however, can become damaged or malfunction. As a result, the driving mode sensor may fail to output a signal indicating a particular driving mode, may simultaneously output signals indicating two different driving modes, or may fail to output any type of driving signal at all.

The transmission control unit (TCU) of conventional automatic transmissions include methodologies for determining the driving mode when such driving mode sensor errors occur. When the conventional TCU fails to receive driving mode signals indicating driving modes between the driving modes indicated by two sequentially received driving mode signals, the conventional TCU determines the driving mode as the driving mode indicated by the last received driving mode signal. For instance, if the conventional TCU receives a driving mode signal indicating park and then a driving mode signal indicating drive without having received driving signals indicating reverse and neutral before the driving signal indicating drive, then the conventional TCU determines that the driving mode is drive.

If the conventional TCU receives a driving mode signal, and thereafter receives no driving mode signal or receives two different driving mode signals simultaneously, then the conventional TCU will select as the driving mode, the driving mode indicated by the previously received driving mode signal. For instance, if the conventional TCU receives a driving mode signal indicating park, and then receives no driving mode signal, or receives driving mode signals indicating neutral and drive simultaneously, then the conventional TCU selects park as the driving mode.

Furthermore, if after starting the vehicle, the conventional TCU receives no driving mode signal, then the conventional TCU selects neutral as the driving mode. Unfortunately, once the driver starts the vehicle, the driver typically moves the driving mode select lever to either reverse or drive. Because of gravity, the vehicle often tends to begin moving in the direction corresponding to the selected driving mode. Thereafter, the driver depresses the accelerator pedal. Because the conventional TCU selects neutral when no driving mode signal is received, the engine merely revs up. This can be very disconcerting to the driver.

SUMMARY OF THE INVENTION

It is an object of the present invention to provide a method and apparatus for controlling the automatic transmission of a vehicle in the absence of a driving mode select signal from a driving mode sensor which overcomes the disadvantages of the prior art.

These and other related objects are achieved by providing a method of controlling an automatic transmission of a vehicle in the absence of a driving mode signal indicating a driving mode of said vehicle, comprising (a) monitoring output from a driving mode sensor; (b) determining whether a driving mode signal has been received from said driving mode sensor based on said monitoring in step (a); (c) placing said automatic transmission in first gear when said step (b) determines that a driving mode signal has not been received; (d) detecting a direction in which said vehicle is traveling; (e) controlling said automatic transmission such that said vehicle continues to travel in said detected direction.

These and other related objects are further achieved by providing an apparatus for controlling an automatic transmission of a vehicle in the absence of a driving mode signal indicating a driving mode of said vehicle, comprising monitoring means for monitoring output from a driving mode sensor; determining means for determining whether a driving mode signal has been received from said driving mode sensor based on said monitoring; sensing means for sensing a direction in which said vehicle is traveling; transmission control means placing said automatic transmission in first gear when said determining means determines that a driving mode signal has not been received, and for controlling said automatic transmission such that said vehicle continues to travel in said detected direction.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Figure 1:
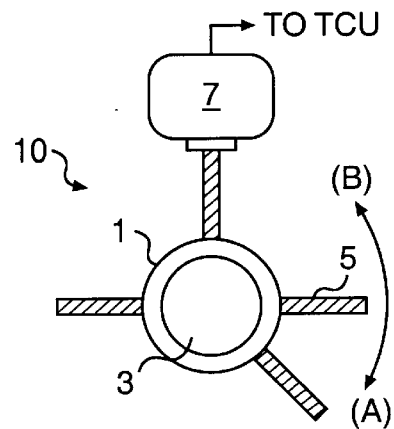
FIG. 1 illustrates a reed vehicle speed sensor.

FIG. 1 illustrates a reed vehicle speed sensor 10 mounted on the output shaft 3 of an automatic transmission of a vehicle. As shown in FIG. 1, the reed vehicle speed sensor 10 includes an annular member 1 having a plurality of vanes 5 projecting in a radial direction therefrom. The annular member 1 is mounted on the output shaft 3 of the automatic transmission such that as the output shaft 3 rotates, the annular member 1 also rotates. The reed vehicle speed sensor 10 further includes a magnetic sensor 7 which detects when a vane 5 passes the magnetic sensor 7.

Typically, reed vehicle speed sensors have vanes symmetrically arranged about the circumference of the annular member. The reed vehicle speed sensor 10 of the present invention, however, has the vanes 5 asymmetrically arranged about the circumference of the annular member 1. Consequently, the reed vehicle speed sensor 10 will generate a different output waveform when the output shaft 3 rotates in direction A (as indicated by the arrow in FIG. 1), than when rotating in direction B (as indicated by the arrow in FIG. 1).

Figure 2A:
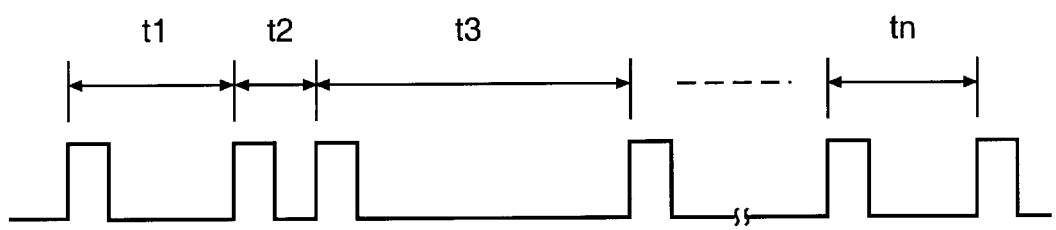
FIG. 2(A) illustrates the output waveform of the reed vehicle speed sensor when the reed vehicle speed sensor rotates in the direction A illustrated in FIG. 1.
Figure 2B:
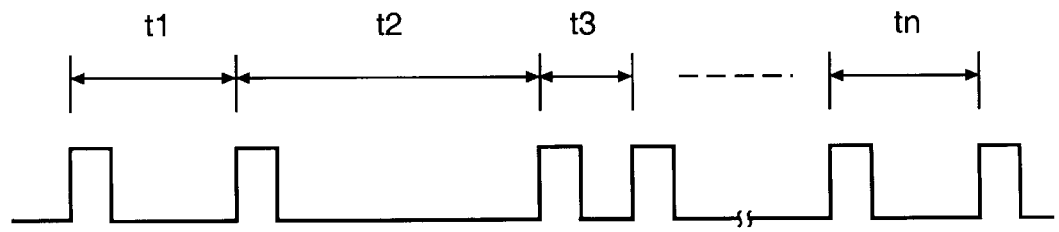
FIG. 2(B) illustrates the output waveform of the reed vehicle speed sensor when the reed vehicle speed sensor rotates in the direction B illustrated in FIG. 1.

FIG. 2(A) illustrates the output waveform of the reed vehicle speed sensor 10 when the reed vehicle speed sensor 10 rotates in direction A, while FIG. 2(B) illustrates the output waveform of the reed vehicle speed sensor 10 when the reed vehicle speed sensors 10 rotates in direction B. As shown in FIGS. 2(A) and 2(B), the reed vehicle speed sensor 10 outputs pulses as the vanes 5 pass the magnetic sensor 7. The time periods t1, t2, t3, . . . , tn between pulses differ when the reed vehicle speed sensor 10 rotates in directions A and B. By measuring the time periods between the pulses in the output waveform from the reed vehicle speed sensor 10, the rotation direction of the output shaft 3 can be determined using the table illustrated in FIG. 3. Consequently, once mounted on a vehicle, the rotation directions A and B will correlate to the vehicle traveling in either the forward direction or the backward direction such that by using the relationship illustrated in FIG. 3, the direction in which the vehicle is traveling can be determined.

Figures 3, 4:
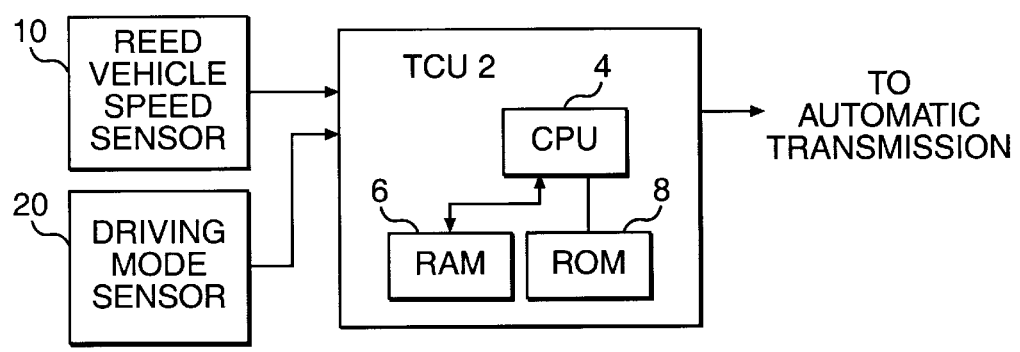
FIG. 3 illustrates a table of time periods between output pulses in the waveforms output by the reed vehicle speed sensor when the reed vehicle speed sensor rotates in direction A and direction B.
FIG. 4 illustrates the apparatus for controlling an automatic transmission in the absence of a driving mode signal from the driving mode sensor of a vehicle according to the present invention.

FIG. 4 illustrates the apparatus for controlling an automatic transmission in the absence of a driving mode signal from the driving mode sensor of a vehicle according to the present invention. As shown in FIG. 4, the apparatus includes a transmission control unit (TCU) 2 connected to the reed vehicle speed sensor 10 and a driving mode sensor 20. Of course, it will be understood by those skilled in the art, that the TCU 2 also receives the output from a plurality of other sensors, but those sensors have not been illustrated for clarity.

The TCU 2 includes a CPU 4 connected to a ROM 8 and a RAM 6. The ROM 8 stores programs which the CPU 4 runs when controlling an automatic transmission. The RAM 6 stores output received from the various sensors connected to the TCU 2, and intermediate values calculated during the running of the program stored by the ROM 8. Based on the programs stored in the ROM 8, the CPU 4 generates control signals for the automatic transmission. Either the ROM 8 or the RAM 6 also store various tables, etc. used by the CPU 4 in generating the control signals.

Figure 5:
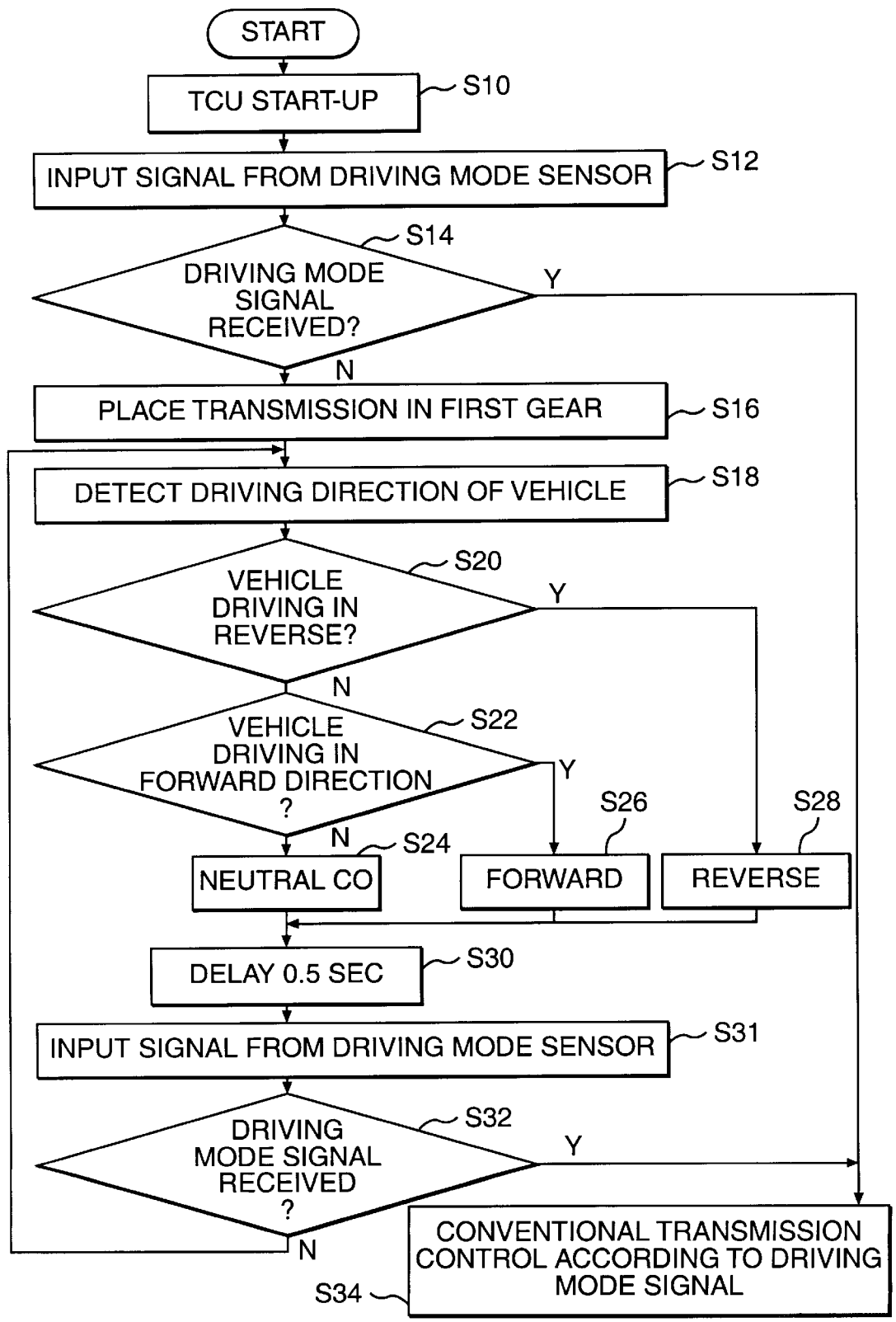
FIG. 5 illustrates a flow chart of the method for controlling an automatic transmission in the absence of a driving mode signal from the driving mode sensor of a vehicle according to the present invention.

FIG. 5 illustrates the flow chart for the method of controlling an automatic transmission in the absence of a driving mode signal from the driving mode sensor of a vehicle according to the present invention. The program implementing this method is stored in the ROM 8 and run by the CPU 4 of the TCU 2. When the vehicle including the TCU 2 is started, power is supplied to the TCU 2 to "start up" the TCU 2 in step S10. The TCU 2 then receives a signal from the driving mode sensor 20 in step S12. Next, in step S14, the TCU 2 determines whether or not a driving mode signal was received. If a driving mode signal was received, then processing proceeds to step S34 where the TCU 2 controls the automatic transmission according to any well-known technique based on the driving mode signal.

If, however, in step S14, the TCU 2 determines that it did not receive a driving mode signal, then processing proceeds to step S16. In step S16, the TCU 2 generates and outputs control signals to the automatic transmission to place the automatic transmission in first gear. Then, in step S18, the TCU 2 detects the driving direction of the vehicle. Specifically, the TCU 2 receives the output signals of the reed vehicle speed sensor 10. Using the table of FIG. 3, stored in the ROM 8 or the RAM 6, the TCU 2 determines whether the output waveform from the reed vehicle speed sensor 10 matches the output waveform corresponding to the backward direction of vehicle travel. If the output waveforms match, then the TCU 2 determines that the vehicle is traveling backwards, and in step S28 generates and outputs control signals to the automatic transmission to place the automatic transmission in reverse.

If, however, in step S20, the TCU 2 does not determine that the vehicle is traveling backwards, then in step S22 the TCU 2 determines whether the vehicle is traveling forward. Again, the TCU 2 compares the output waveform of the reed vehicle speed sensor 10 to the output waveform stored in the table of FIG. 3 corresponding to vehicle travel in the forward direction. If a match is found, then the TCU 2 determines that the vehicle is traveling in the forward direction, and generates and outputs control signals to the automatic transmission in step S26 to place the automatic transmission in drive.

If, however, in step S22 the TCU 2 does not determine that the vehicle is driving in the forward direction, then in step S24 the TCU 2 selects the neutral driving mode, and outputs control signals to the automatic transmission accordingly.

After steps S24, S26, or S28, processing proceeds to step S30. In step S30, the TCU 2 delays further processing for a predetermined period of time. In a preferred embodiment, the predetermined period of time is 0.5 seconds. This allows the control determined in either step S24, S26, or S28 to continue for at least 0.5 seconds.

After step S30, processing proceeds to step S31 wherein the TCU 2 again receives a signal from the driving mode sensor 20. Next, in step S32, the TCU 2 determines whether a driving mode signal was received. If no driving mode signal was received, processing returns to step S18. If, however, a driving mode signal was received, then processing proceeds to step S34 discussed above.

As discussed above, when a vehicle is initially started and no driving mode signal is received by the transmission control unit, conventional transmission control units place the vehicle in neutral. Consequently, when the driver depresses the accelerator pedal, the engine revs, causing discomfort to the driver. By contrast, under the same conditions, the transmission control unit according to the present invention determines whether to select one of the reverse, drive, or neutral driving mode. Thus, if the driver does move the driving mode select lever to drive or reverse and the vehicle begins to drift forward or backwards, respectively, the TCU according to the present invention will select the drive or reverse driving mode such that power is transmitted from the engine to the driving wheels of the vehicle. As a result, the engine does not rev and the driver is not disconcerted.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of controlling an automatic transmission of a vehicle in the absence of a driving mode signal indicating a driving mode of said vehicle, comprising:
   (a) monitoring output from a driving mode sensor;
   (b) determining whether a driving mode signal has been received from said driving mode sensor based on said monitoring in step (a);
   (c) placing said automatic transmission in first gear when said step (b) determines that a driving mode signal has not been received;
   (d) detecting a direction in which said vehicle is traveling;
   (e) controlling said automatic transmission such that said vehicle continues to travel in said detected direction.

2. The method of claim 1, wherein said step (d) detects a direction in which said vehicle is traveling based on output from a vehicle speed sensor.

3. The method of claim 2, wherein said vehicle speed sensor output when said vehicle travels in a forward direction differs from said vehicle speed sensor output when said vehicle travels in a backward direction, and said step (d) detects whether output from said vehicle speed sensor indicates that said vehicle is traveling in said forward or backward direction.

4. The method of claim 2, wherein said step (e) places said automatic transmission in reverse when said step (d) indicates that said vehicle is traveling in a backward direction.

5. The method of claim 4, wherein said step (e) places said automatic transmission in drive when said step (d) indicates that said vehicle is traveling in a forward direction, and places said automatic transmission in neutral when said step (d) does not detect that said vehicle is traveling in either said forward or backward direction.

6. The method of claim 1, wherein
   said step (e) controls said automatic transmission such that said vehicle continues to travel in said detected direction for a predetermined period of time; and further comprising,
   (f) monitoring output from a driving mode sensor when said predetermined period of time expires;
   (g) determining whether a driving mode signal has been received from said driving mode sensor based on said monitoring in step (f); and
   (h) repeating steps (c)–(e) when step (g) determines a driving mode signal has not been received.

7. The method of claim 6, further comprising:
   (i) controlling said automatic transmission according to said driving mode signal when said step (g) determines that a driving mode signal has been received.

8. The method of claim 1, further comprising:
   (f) controlling said automatic transmission according to said driving mode signal when said step (b) determines that a driving mode signal has been received.

9. An apparatus for controlling an automatic transmission of a vehicle in the absence of a driving mode signal indicating a driving mode of said vehicle, comprising:
   monitoring means for monitoring output from a driving mode sensor;
   determining means for determining whether a driving mode signal has been received from said driving mode sensor based on said monitoring;
   sensing means for sensing a direction in which said vehicle is traveling;
   transmission control means placing said automatic transmission in first gear when said determining means determines that a driving mode signal has not been received, and for controlling said automatic transmission such that said vehicle continues to travel in said detected direction.

10. The apparatus of claim 9, wherein said sensing means is a vehicle speed sensor.

11. The apparatus of claim 10, wherein said vehicle speed sensor is a reed vehicle speed sensor having asymmetrical vanes such that said reed vehicle speed sensor produces a different output when said vehicle travels in a forward direction than when said vehicle travels in a backward direction.

12. The apparatus of claim 9, wherein said transmission control means places said automatic transmission in reverse when said sensing means indicates that said vehicle is traveling in a backward direction.

13. The apparatus of claim 12, wherein said transmission control means places said automatic transmission in drive when said sensing means indicates that said vehicle is traveling in a forward direction, and places said automatic transmission in neutral when said sensing means does not detect that said vehicle is traveling in either said forward or backward direction.

14. The apparatus of claim 9, wherein
   said transmission control means controls said automatic transmission such that said vehicle continues to travel in said detected direction for a predetermined period of time;
   said monitoring means monitors output from a driving mode sensor when said predetermined period of time expires;
   said determining means determines whether a driving mode signal has been received from said driving mode sensor based on said monitoring performed after said predetermined period of time expires; and
   said transmission control means repeats said placing and controlling operations when said determining means determines a driving mode signal has not been received after said predetermined period of time expires.

15. The apparatus of claim 14, wherein said transmission control means controls said automatic transmission according to said driving mode signal when said determining means determines that a driving mode signal has been received after said predetermined period of time expires.

16. The apparatus of claim 9, wherein said transmission control means controls said automatic transmission according to said driving mode signal when said determining means determines that a driving mode signal has been received.

* * * * *